(12) United States Patent
Wang et al.

(10) Patent No.: US 9,639,598 B2
(45) Date of Patent: May 2, 2017

(54) LARGE-SCALE DATA CLUSTERING WITH DYNAMIC SOCIAL CONTEXT

(71) Applicant: International Business Machines Corporation, Armonk, NY (US)

(72) Inventors: Jun Wang, White Plains, NY (US); Jinfeng Yi, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 14/448,271

(22) Filed: Jul. 31, 2014

(65) Prior Publication Data

US 2016/0034554 A1    Feb. 4, 2016

(51) Int. Cl.
| | | |
|---|---|---|
| G06F 17/30 | (2006.01) | |
| G06F 7/00 | (2006.01) | |
| G06F 17/10 | (2006.01) | |
| G06K 9/00 | (2006.01) | |
| G06Q 50/00 | (2012.01) | |
| G06K 9/62 | (2006.01) | |
| G06Q 30/02 | (2012.01) | |

(52) U.S. Cl.
CPC ........ *G06F 17/30598* (2013.01); *G06F 17/10* (2013.01); *G06K 9/00* (2013.01); *G06K 9/622* (2013.01); *G06Q 30/0282* (2013.01); *G06Q 50/00* (2013.01); *G06Q 50/01* (2013.01)

(58) Field of Classification Search
CPC ..... G06F 17/10; G06F 17/30598; G06K 9/00; G06Q 50/00; H04L 67/10
USPC ........................................................ 707/737
See application file for complete search history.

(56) References Cited

U.S. PATENT DOCUMENTS

| | | | | |
|---|---|---|---|---|
| 7,461,073 B2 * | 12/2008 | Gao | ................... | G06F 17/30598 707/999.01 |
| 7,958,104 B2 | 6/2011 | O'Donnell | | |
| 8,285,719 B1 * | 10/2012 | Long | ................. | G06F 17/30598 707/737 |
| 9,043,329 B1 * | 5/2015 | Patton | ................. | G06F 17/3087 707/740 |

(Continued)

FOREIGN PATENT DOCUMENTS

| | | |
|---|---|---|
| CN | 102799616 A | 11/2012 |
| WO | 2008109821 A1 | 9/2008 |
| WO | 2012001216 A1 | 1/2012 |

OTHER PUBLICATIONS

Conti, M. et al., "A Model to Represent Human Social Relationships in Social Network Graphs", Social Informatics, 4th International Conference, SocInfo 2012 Proceedings, pp. 174-187, 2012.

(Continued)

*Primary Examiner* — Pavan Mamillapalli
(74) *Attorney, Agent, or Firm* — Scully, Scott, Murphy & Presser, P.C.; Daniel P. Morris (57) ABSTRACT

A system and method for dynamic, semi-supervised clustering comprises receiving data attributes, generating a set of ensemble partitions using the data attributes, forming a convex hull using the set of ensemble partitions, generating a simplex vector by performing ensemble clustering on the convex hull, receiving dynamic links, deriving an optimal simplex vector using the simplex vector and the dynamic links, computing a current optimal clustering result using the optimal simplex vector, and outputting the current optimal clustering result.

18 Claims, 8 Drawing Sheets

(56) References Cited

U.S. PATENT DOCUMENTS

| | | | |
|---|---|---|---|
| 9,135,658 B2* | 9/2015 | Sprague | G06F 17/30412 |
| 9,171,158 B2* | 10/2015 | Akoglu | H04L 63/1425 |
| 2003/0063779 A1* | 4/2003 | Wrigley | G06Q 30/02 |
| | | | 382/116 |
| 2007/0239694 A1* | 10/2007 | Singh | G06F 17/30958 |
| | | | 707/999.003 |
| 2008/0114800 A1* | 5/2008 | Gazen | G06F 17/30861 |
| | | | 707/999.101 |
| 2009/0292549 A1* | 11/2009 | Ma | G06K 9/00335 |
| | | | 705/319 |
| 2010/0185672 A1* | 7/2010 | Rising, III | G06K 9/6251 |
| | | | 707/780 |
| 2010/0332475 A1* | 12/2010 | Birdwell | G06F 17/30333 |
| | | | 707/737 |
| 2012/0059843 A1 | 3/2012 | O'Donnell | |
| 2012/0259855 A1* | 10/2012 | Mizuguchi | G06F 17/30598 |
| | | | 707/739 |
| 2013/0226850 A1 | 8/2013 | Hannuksela et al. | |
| 2014/0165198 A1* | 6/2014 | Altman | H04L 63/145 |
| | | | 726/23 |

OTHER PUBLICATIONS

IBM, "Approach and System to Enable Large Scale Social Analysis", http://ip.com/IPCOM/000184998D, Jul. 7, 2009.

Spi Dst et al., "The Social Dynamics of Technical Innovation in the Computing World", http://ip.com/IPCOM/000128321D, Sep. 15, 2005.

* cited by examiner

FIG. 1

Algorithm 1 Efficient and Dynamic Semi-supervised Algorithm by Convex searching 1: Input:
   $X \in R^{n \times d}$: feature representations
   $\Omega_t$: new pairwise constraints received at time $t$
   $\Omega_{t_-}$: old pairwise constraints received before time $t$
   m: number of ensemble partitions
   r: number of clusters
   n: step size 2: Offline Computation (*compute the convex hull and* $\gamma^{t-1}$):
3: Generate $m$ ensemble partitions $P_e = \{P_1, ..., P_m\}$ by applying fast spectral clustering with subspace sampling and Hungarian algorithm
4: Compute $\gamma^0$ by ensemble clustering on $P_e$
5: Generate $\gamma^{t-1}$ based on $X$ and pairwise constraints $\Omega_t$ 6: Online Updating (*update* $\gamma^t$ *from* $\gamma^{t-1}$ *and* $\Omega_t$):
7: while some pairwise constraints in $\Omega_t$ remains unread do
8:   Read the next pairwise constraint $s_{ij} \in \Omega_t$
9:   Compute a diagonal matrix $A^{(ij)}$ based on Eqn. (11)
10: end while
11: Update $\gamma^t$ based on Eqn. (10)
12: Compute $P = \gamma^t_1 P_1 + \gamma^t_2 P_2 + ... + \gamma^t_m P_m$ 13 Output: uplaod partition by applying fast $k$-means on $P$

Clustering performance of the proposed dynamic semi-supervised clustering algorithm (CCCS) and the baseline algorithm (MPCKmeans (MPCK) [8], CCSKL [29], PMMC [50], RCA [3], DCA [18], LMNN [45], and ITML [15]) from tier $t_1$ to $t_{10}$ on six datasets.

Clustering performance of the proposed dynamic semi-supervised clustering algorithm (CCCS) and the baseline algorithm (MPCKmeans (MPCK) [8], CCSKL [29], PMMC [50], RCA [3], DCA [18], LMNN [45], and ITML [15]) from tier $t_1$ to $t_{10}$ on six datasets.

Table: Average CPU time (in seconds) for updating the partition in each tier. (N/A means that the clustering task cannot be accomplished by the algorithms within 10 hours.)

| Datasets | Tiers | CCCS | MPCK | CCSKL | PMMC | RCA | DCA | LMNN | ITML |
|---|---|---|---|---|---|---|---|---|---|
| MNIST | $t_1$ | 3.9 | 13.5 | 9,410 | N/A | 195 | 142 | 19,265 | 8,736 |
| | $t_2$ | 3.9 | 13.5 | 9,479 | N/A | 195 | 142 | 19,786 | 8,917 |
| | $t_3$ | 3.9 | 13.6 | 9,598 | N/A | 193 | 147 | 20,243 | 9,243 |
| | $t_4$ | 3.9 | 13.6 | 9,724 | N/A | 199 | 148 | 20,775 | 9,208 |
| | $t_5$ | 3.9 | 13.9 | 9,913 | N/A | 199 | 152 | 21,185 | 9,523 |
| | $t_6$ | 3.9 | 13.8 | 9,987 | N/A | 207 | 155 | 22,064 | 9,431 |
| | $t_7$ | 3.9 | 14.1 | 10,175 | N/A | 213 | 155 | 22,217 | 9,716 |
| | $t_8$ | 3.9 | 14.3 | 10,486 | N/A | 215 | 158 | 22,808 | 9,798 |
| | $t_9$ | 3.9 | 14.8 | 10,997 | N/A | 219 | 161 | 23,165 | 9,814 |
| | $t_{10}$ | 3.9 | 14.9 | 11,485 | N/A | 224 | 162 | 23,783 | 9,998 |
| 20 Newsgroups | $t_1$ | 2.6 | 9.7 | 27,143 | 52,106 | 467 | 382 | 62,305 | 44,276 |
| | $t_2$ | 2.6 | 9.7 | 27,985 | 54,271 | 489 | 377 | 64,283 | 46,165 |
| | $t_3$ | 2.6 | 9.7 | 28,643 | 55,193 | 497 | 382 | 65,782 | 46,686 |
| | $t_4$ | 2.6 | 9.9 | 28,457 | 55,889 | 498 | 389 | 65,993 | 47,213 |
| | $t_5$ | 2.6 | 10.1 | 29,925 | 57,214 | 503 | 390 | 67,034 | 48,309 |
| | $t_6$ | 2.6 | 10.7 | 30,473 | 57,421 | 512 | 391 | 67,495 | 49,241 |
| | $t_7$ | 2.6 | 10.6 | 31,528 | 59,804 | 514 | 391 | 68,221 | 50,385 |
| | $t_8$ | 2.6 | 10.9 | 31,986 | 61,629 | 520 | 395 | 68,909 | 51,186 |
| | $t_9$ | 2.6 | 11.8 | 33,483 | 62,185 | 527 | 397 | 69,998 | 52,498 |
| | $t_{10}$ | 2.6 | 12.5 | 35,104 | 64,007 | 525 | 399 | 71,213 | 54,012 |
| RCV1 | $t_1$ | 29.0 | 129 | N/A | N/A | 1,796 | 1,505 | N/A | N/A |
| | $t_2$ | 28.9 | 131 | N/A | N/A | 1,796 | 1,505 | N/A | N/A |
| | $t_3$ | 28.9 | 134 | N/A | N/A | 1,823 | 1,524 | N/A | N/A |
| | $t_4$ | 28.9 | 135 | N/A | N/A | 1,831 | 1,524 | N/A | N/A |
| | $t_5$ | 28.4 | 135 | N/A | N/A | 1,843 | 1,529 | N/A | N/A |
| | $t_6$ | 28.1 | 137 | N/A | N/A | 1,837 | 1,534 | N/A | N/A |
| | $t_7$ | 28.8 | 141 | N/A | N/A | 1,844 | 1,538 | N/A | N/A |
| | $t_8$ | 28.8 | 142 | N/A | N/A | 1,856 | 1,543 | N/A | N/A |
| | $t_9$ | 29.2 | 144 | N/A | N/A | 1,876 | 1,571 | N/A | N/A |
| | $t_{10}$ | 29.4 | 147 | N/A | N/A | 1,889 | 1,577 | N/A | N/A |

LARGE-SCALE DATA CLUSTERING WITH DYNAMIC SOCIAL CONTEXT

BACKGROUND

The present disclosure relates generally to the field of semi-supervised clustering.

Data clustering is an important task that has found numerous applications in many domains, including information retrieval, recommender systems, computer vision, etc. However, data clustering is inherently a challenge and ill-posed problem due to its unsupervised nature. Semi-supervised clustering addresses this issue by effectively exploring the available side information that is often cast in the form of pairwise constraints: must-links for pairs of data points that belong to the same cluster, and cannot-links for pairs of data points that belong to different clusters. There are two major categories of approaches to semi-supervised clustering: (i) the constrained clustering approaches that employ the side information to restrict the solution space and only find the solution that is consistent with the pairwise constraints, and (ii) the distance metric learning based approaches that first learn a distance metric from the given pairwise constraints, and then perform data clustering using the learned distance metric.

One issue that is often overlooked by the existing semi-supervised clustering approaches is how to efficiently update the data partitioning when the pairwise constraints are dynamic, i.e., when new pairwise constraints are generated sequentially. This is a natural situation in various real-world applications. For example, in social networks, the user attributes, such as gender, school, major, nationality, interests, etc., can be considered as features, and the social connections, like friendship and common community membership, can be considered as the side information. Hence, the task of grouping users is essentially a semi-supervised clustering problem. However, since the connections in the social network are often changing, one needs a semi-supervised clustering algorithm that is able to cope with dynamic pairwise constraints. In addition, applications of crowdsourcing often require soliciting contributions dynamically collected from a large group of human workers. In the framework of semi-supervised crowd clustering, a set of objects should be partitioned based on their features as well as manual annotations collected through crowdsourcing, where those annotations (e.g., pairwise constraints) are provided by a set of online users instead of a single oracle in a sequential way.

Active semi-supervised clustering aims to select the pairwise constraints or queries in an active way to improve the clustering performance. Thus this active clustering also needs efficient updating with dynamic pairwise constraints. Due to the requirements of dynamic updating, neither the constrained clustering nor the distance metric based semi-supervised clustering efficiently update the partitioning results when the pairwise constraints are changed since each clustering needs to re-optimize the objective function over all the data points, making both clusterings computationally infeasible for large scale datasets.

Moreover, in social network analysis, the problem of updating the user communities based on the connections has attracted growing attention. However, the existing work about social network partitioning are different from the setting of dynamic semi-supervised clustering, mainly because of the following two reasons: (i) the existing work often only uses link information to guide the clustering and ignores the important feature information of the data points (i.e., users), and (ii) the existing work needs to observe all the link information between users, while semi-supervised clustering only assumes to observe a small portion of pairwise constraints to guide the partition.

BRIEF SUMMARY

A system and method which provides a solution to the need for efficient and dynamic semi-supervised clustering is presented. The solution enables efficiently updating the clustering results given new pairwise constraints. Due to the flexibility of handling both data features and dynamic relational information, the semi-supervised clustering is a more general formulation which can be applied in numerous scenarios including, but not limited to, social network partitioning.

A method for dynamic, semi-supervised clustering can comprise receiving data attributes, generating a set of ensemble partitions using the data attributes, forming a convex hull using the set of ensemble partitions, generating a simplex vector by performing ensemble clustering on the convex hull, receiving dynamic links, deriving an optimal simplex vector using the simplex vector and the dynamic links, computing a current optimal clustering result using the optimal simplex vector, and outputting the current optimal clustering result.

A system for dynamic, semi-supervised clustering can comprise a memory, an output device and a hardware processor configured to: receive data attributes, generate a set of ensemble partitions using the data attributes, form a convex hull using the set of ensemble partitions, generate a simplex vector by performing ensemble clustering on the convex hull, receive dynamic links, derive an optimal simplex vector using the simplex vector and the dynamic links, compute a current optimal clustering result using the optimal simplex vector, and output the current optimal clustering result to the output device.

In one aspect, receiving links, deriving an optimal simplex vector, and computing a current best clustering result are repeated. In one aspect, the attributes are received from one of: handwritten images as vectors, and a profile obtained from a social networking platform. In one aspect, the ensemble partitions are generated using fast spectral clustering with subspace sampling. In one aspect, the ensemble partitions are generated using fast spectral clustering with a Hungarian algorithm. In one aspect, the dynamic links comprising must-link links and cannot-link links.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 illustrates a table of average CPU time for updating the partition in each tier.

DETAILED DESCRIPTION

A system and method for efficient and dynamic semi-supervised clustering via convex searching is presented. The system and method is both time and memory efficient. In the system and method, the clustering problem can be cast into a searching problem in a feasible clustering space, where each point in that space corresponds to one partitioning result of the data. The dynamic semi-supervised clustering algorithm presented herein directly searches in a convex clustering space to derive a feasible partitioning that is consistent with the updated pairwise constraints. The clustering space is a convex hull with the extreme points being m different partitions of the initial n data points after realigning by the Hungarian algorithm (see Harold W. Kuhn, "The Hungarian Method for the Assignment Problem"). Each of the m partitions is known as an ensemble partition denoted by $P_1, P_2, \ldots, P_m$.

Note that any inner point in such a convex hull can be mapped to a feasible data partitioning. According to the median partition based ensemble clustering approaches, the optimal partition should be similar to all the ensemble partitions. In other words, the optimal partition should lie in the inner space of this convex hull and the partition can be uniquely represented as an m-dimensional simplex vector $\gamma = \{\gamma_1, \ldots, \gamma_m\}$ given that the m extreme points are fixed. In particular, when a set of new pairwise constraints is received at time t, the simplex $\gamma^t$ is updated based on $\gamma^{t-1}$ through a natural relaxation of the gradient descent step. Since $\gamma^{t-1}$ is the optimal solution that is consistent with both the data features and the pairwise constraints received before time t, the partition can be updated to $\gamma^t$ directly from $\gamma^{t-1}$ based on the newly arrived pairwise constraints without considering all of the n data points. After updating $\gamma^t$, the partitioning matrix can be obtained by a convex combination of the ensemble partitions as $P = \gamma^t_1 P_1 + \gamma^t_2 P_2 + \ldots + \gamma^t_m P_m$, where $\gamma^t_i$ indicates the i-th entry of the simplex vector $\gamma^t$. Then the final data partitions can be obtained by applying fast k-means algorithm on P.

Figure 1:
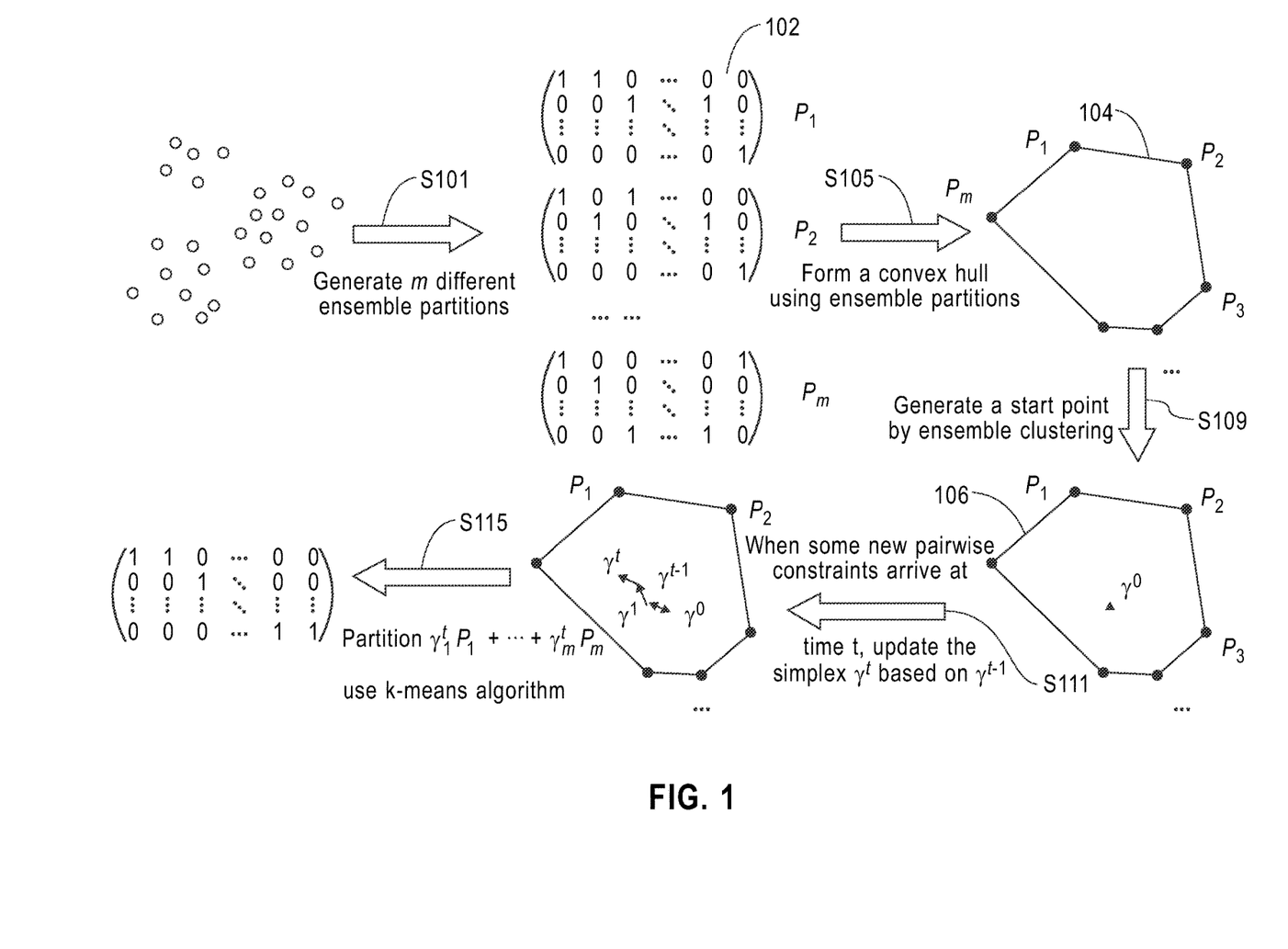
FIG. 1 shows the basic steps of the inventive algorithm.

FIG. 1 shows one embodiment of a method that is run on a computer system, such as, for example, the system shown in FIG. 6, which will be described in detail below. The basic steps of FIG. 1 are as follows. In step S101, the system receives or obtains data attributes that are processed to generate m different ensemble partitions $P_1, P_2, \ldots, P_m$ 102 from data attributes. These data attributes can be obtained, for example, as vectors from handwritten images, such as digital images, scanned imaged, etc., or from a user profile in a social networking platform such as LinkedIn®, Facebook™, etc. In step S105, the computer system is configured to form a convex hull 104 using the generated ensemble partitions. In step S109, a start point, e.g., simplex vector 106, is generated by ensemble clustering performed using the convex hull. Steps S101-S109 can be performed in an off-line or static mode, as discussed in more detail below.

In step S111, the system receives new pairwise constraints, for example at time t, and updates the simplex vector based on the newly received pairwise constraints and a previously generated simplex vector, if available. (In the initial execution of the algorithm, no previously generated simplex vector exists.) The simplex vector can be updated through solving a mathematical optimization problem, as is known to one skilled in the art. In step S115, the system is configured to compute the current optimal clustering results. In one embodiment, this may be performed using a k-means clustering algorithm. In other words, the clusters are efficiently updated in accordance with the dynamic links to create a current optimal clustering result. This result can be displayed on an output device such as a printer or computer monitor. In one embodiment, the display of results can be a graphical demonstration. In one embodiment, the display of results can be a text format indicating the group memberships of each item, such as users, objects, etc. Steps S111-S115 can be performed dynamically, and can be repeated as additional dynamic links are received.

The current best clustering result can be, for example, clusters or small groups of data based on particular attributes. For example, if the data attributes received in step S101 are obtained from a user's profile which includes user's location and user's language, then the current optimal clustering result can be clusters of users grouped by attributes of user location and user language. In another example, if the data attributes are obtained from handwritten images which include color, then the current optimal clustering result can be clusters of images grouped by attribute of color. Other attributes can also be used.

In summary, the dynamic clustering is performed through updating an m-dimensional simplex vector, where the computational cost is only related to m, the dimension of the simplex space. Note that a simplex vector is a vector whose elements are non-negative and the summation of all of the elements equals one (1). Typically, the value of m will be far smaller than the size of data n. Hence, the online updating process of the algorithm is extremely scalable. To verify the efficiency and effectiveness of this algorithm, empirical studies, which were conducted on several real-world benchmark datasets, are described below. The results show that this algorithm outperforms state-of-the art semi-supervised clustering algorithms in both clustering accuracy and computational efficiency.

The system and method can be described in more detail as follows. Let $D=\{O_1, \ldots, O_n\}$ be the set of n objects to be clustered, and let $X=(x_1, \ldots, x_n)$ be their feature representations, where $x_i \in R^d$ is a vector of d dimensions. Given X, one can easily derive a similarity matrix $W \in R^{n \times n}$, where $W_{ij}$ indicates the similarity between object i and object j based on their features. Let M denote the set of new must-link constraints where $(x_i, x_j) \in M$ implies that $x_i$ and $x_j$ should be in the same cluster. Let C denote the set of new cannot-link constraints, where $(x_i, x_j) \in C$ implies that $x_i$ and $x_j$ belong to different clusters. For the convenience of presentation, also define set $\Omega_t = M \cup C$ to include all the new pairwise constraints generated at time t. Also, $\Omega_{t^-}$ is denoted as all the existing pairwise constraints generated before time t and $\Omega = \Omega_t \cup \Omega_{t^-}$. Let r be the number of clusters. In one embodiment, the inventive dynamic semi-supervised clustering algorithm partitions n objects into r clusters that are (i) consistent with the data matrix X and the existing pairwise constraints $\Omega_{t^-}$ such that data points with similar input patterns and dense connections are put into the same cluster, and (ii) are able to efficiently update the clusters with new pairwise constraints in $\Omega_t$.

A set of binary membership matrices is defined as $F=\{F|F \in \{0,1\}^{n \times r}, F_{*i}^T F_{*j} = 0 \forall i \neq j, \Sigma F_{k*} = 1: \forall k\}$. Given the similarity matrix W and the pairwise constraints $\Omega$, a set of classical constrained clustering algorithms want to find a membership matrix F which optimize the following objective function:

$$\min_{F \in \mathcal{F}} \frac{1}{|\Omega|} \sum_{s \in \Omega} \mathcal{L}(s, F) + \lambda \mathcal{R}(W, F), \quad (EQ\ 1)$$

where $\mathcal{L}(\bullet)$ is a loss function which incurs non-zero penalty if the membership F is not consistent with the pairwise constraint s, and R ($\bullet$) is a regularizer function to impose a reasonable partition given the similarity matrix W.

To efficiently update the membership matrix F with new pairwise constraints, the data clustering problem is transferred into a searching problem in a convex set, such that each inner point of the set can map to a feasible clustering result. To this end, all the possible clustering results form a convex hull with $r^n$ extreme points. Then this set can be restricted to a smaller convex hull with significantly fewer extreme points by applying a spectral relaxation.

Next, a convex searching space is generated. In this generating step, the clustering problem is cast into the problem of searching in a convex set. To this end, (EQ 1) is rewritten by defining regularizer function R ($\bullet$) as graph embedding function:

$$\min_{F \in \mathcal{F}} \frac{1}{|\Omega|} \sum_{s \in \Omega} \mathcal{L}(s, F) + \lambda \mathrm{tr}(F^T L F) \quad (EQ\ 2)$$

where tr($\bullet$) is the trace function and L is the graph Laplacian matrix defined by L=D−W (e.g., L is an approximation of $\mathcal{L}$ in EQ 1). Here D is a diagonal matrix D=diag($d_1, d_2, \ldots, d_n$) with $d_i = \Sigma_j W_{ij}$. The reason to use graph embedding as regularization function is that:

$$\mathrm{tr}(F^T L F) = \frac{1}{2} \sum_{i=1}^{r} \sum_{j,k=1}^{n} W_{jk} (F_{ji} - F_{ki})^2$$

enables finding the partitions such that the objects in the same cluster share large similarities while the objects from different clusters share small similarities. However, it can be shown that $$\min_{F \in \mathcal{F}} \mathrm{tr}(F^T L F)$$

binary integer programming ("BIP") problem, which is NP hard and not easy to optimize.

To address the above issue, the objective (EQ 2) subject to the following constraint optimization problem can be rewritten as:

$$\min_{F \in \mathcal{F}} \frac{1}{|\Omega|} \sum_{s \in \Omega} \mathcal{L}(s, F) \quad (EQ\ 3)$$
$$\text{s.t. } \mathrm{tr}(F^T L F) \leq \Lambda,$$

where $\Lambda$ is a positive parameter ensuring that the optimization function (EQ 3) has feasible solutions. The set $\Delta = \{F | \mathrm{tr}(F^T L F) \leq \Lambda, F \in \mathbb{R}^{n \times r}\}$. Note that this set $\Delta$ is a convex set given the graph Laplacian matrix L is a Positive-Definite (PSD) Matrix. The constraint optimization problem (EQ 3) is used to find a partition in the convex set $\Delta$ that best matches all the pairwise constraints in $\Omega$. Since the convex set $\Delta$ is still not easy to project into, the set $\Delta$ can be approximated to another convex set that is much easier to represent. Accordingly, the following lemma is provided.

Lemma 1: All the feasible partitions F$\in \mathcal{F}$ are the extreme points of a convex hull. This can be easily proved by contradiction.

Suppose not all the feasible partitions F$\in \mathcal{F}$ are the extreme points of a convex hull, then at least one feasible partition, denoted as $F_1$, is the inner point of a convex hull whose extreme points are some other feasible partitions $F_1, \ldots F_l \in \mathcal{F}$. Thus, $F_1$ is a convex combination of $F_1, \ldots F_l$:

$$F_i = \sum_{j=1}^{l} \gamma_j F_j$$

where $\gamma$ is an l-dimensional vector satisfying $\gamma \geq 0$ and $1^T \gamma = 1$. Note that each row of $F_i$ contains only a single one (1) and all the other elements are zero (0); $\gamma_j$ should be equal to 0 for any $F_j \neq F_i$. Otherwise $F_i$ cannot be equal to $$A = \sum_{j=1}^{l} \gamma_j F_j$$

since there exist at least one index (a, b) such that $F_i(a, b)=0$ while A(a,b)>0. Since $F_i \neq F_j$, $\forall j=1, \ldots, l$, we have $Y=0^1$, which contradict with the constraint $1^T \gamma = 1$.

Similarly, the following lemma can be derived.

Lemma 2. Any non-empty subsets of $\mathcal{F}$ are the extreme points of a convex hull.

Given Lemma 2, the algorithm finds a set of feasible partitions in $\mathcal{F}$ to form a convex hull $\Delta'$ such that it is a good approximation to the convex constraint set $\Delta$ in (EQ 3). To obtain multiple partitions using spectral clustering, a common strategy can be used to generate multiple partitions of a same data set in ensemble clustering. First, randomly select some subsets of features in X, then generate m different similarity matrices denoted as $S_1, S_2, \ldots, S_m$. Then apply the spectral clustering algorithm, which is a spectral relaxation of an NP hard normalized graph cut, to find multiple data partitions, i.e. compute the top r eigenvectors of $S_i$, i=1, \ldots, m, and then run the k-means cluster algorithm over the computed eigenvectors. To improve the computational efficiency, apply a spectral clustering algorithm that reduces computational cost by a matrix sparsification technique and a Nystrom approximation.

Let $P_1, \ldots, P_m \in \mathcal{F}$ be m ensemble partitions that are generated from spectral clustering using random subspaces, followed by applying the Hungarian algorithm to realign their labels. Then, a convex hull can be formed according to:

$$\Delta' = \left\{ F \mid F = \sum_{i=1}^{m} \gamma_i P_i, \gamma \geq 0, 1^T \gamma = 1 \right\},$$

where each simplex vector $\gamma$ corresponds to one point F in the convex hull $\Delta'$ and r clusters can be easily generated by running a simple clustering algorithm such as k-means on F.

In one embodiment, the validity of searching feasible partitions in the convex hull $\Delta'$ is ensured by: (i) since spectral clustering essentially optimizes $$\min_{F \in \mathcal{F}} tr(F^T L F)$$

by spectral relaxation, the extreme points $F_1, \ldots, F_m$ obtained using spectral clustering should form a convex hull that is closely related to the original convex set $\Delta = \{F | tr(F^T L F) \leq \Lambda, F \in R^{n \times r}\}$ in the optimization problem (EQ 3), and (ii) according to the median partition based ensemble clustering approaches, the optimal partition should be similar to all the individual partitions indicating that the optimal partition should lie in the inner space of the convex hull $\Delta'$ and it can be uniquely represented by an m-dimensional simplex vector $\gamma$.

Then the problem of finding a large-scale n x r matrix F is cast into the problem of finding an m-dimensional simplex vector $\gamma$, according to (EQ 4) as follows:

$$\min_{\gamma \in R^m} \frac{1}{|\Omega|} \sum_{s \in \Omega} L(s, F) \quad \text{(EQ 4)}$$

$$\text{s.t. } F = \sum_{i=1}^{m} \gamma_i F_i,$$

$$\gamma \geq 0,$$

$$1^T \gamma = 1.$$

Since $m = O(1)$ is a small number that is irrelevant to the data size n, the proposed semi-supervised algorithm is very efficient and can handle very large-scale datasets.

Efficiently Updated Dynamic Semi-supervised Clustering is now described. When the existing pairwise constraints set $\Omega_{t_-}$ is empty, the problem (EQ 4) reduces to an ensemble clustering problem which aims to combine multiple partitions of a dataset, generated by different clustering algorithms, into a single data partition. The clustering result in terms of simplex vector $\gamma$, denoted as vector $\gamma^0$, can be simply set to $(1/m, \ldots, 1/m)$ or obtained by some existing ensemble clustering algorithms. Note that the pairwise constraints set $\Omega$ contains two subsets: the new pairwise constraints $\Omega_t$ generated at time t and the existing pairwise constraints $\Omega_{t_-}$ generated before time t. Accordingly the partition from the simplex $\gamma^{t-1}$, which was generated from data points X and the pairwise constraints $\Omega_{t_-}$ to $\gamma^t$ using the new pairwise constraints $\Omega_t$ must be efficiently updated. This leads to the following optimization problem:

$$\min_{\gamma^t \in R^m} \frac{1}{|\Omega|} \sum_{s \in \Omega_t} L(s, F) + C|\gamma^t - \gamma^{t-1}|_2^2 \quad \text{(EQ 5)}$$

$$\text{s.t. } F = \sum_{i=1}^{m} \gamma_i^t P_i,$$

$$\gamma^t \geq 0,$$

$$1^T \gamma^t = 1.$$

The first term of objective function (EQ 5) searches for a new partition $\gamma^t$ which is most consistent with the new set of pairwise constraints $\Omega$ while the second term ensures that the new partition $\gamma^t$ is not far away from the previous partition $\gamma^{t-1}$ because a small number of pairwise constraints usually cannot significantly change the clustering structure of a large data set.

By applying the loss function L as the hinge loss, the optimization problem can be rewritten according to (EQ 6) as follows:

$$\min_{\gamma^t \in R^m} \sum_{s_{ij} \in M} \max(0, |F_{i,*} - F_{j,*}|_2^2 - \mu) + \quad \text{(EQ 6)}$$

$$\sum_{s_{ij} \in C} \max(0, \delta - |F_{i,*} - F_{j,*}|_2^2) + \lambda |\gamma^t - \gamma^{t-1}|_2^2$$

$$\text{s.t. } F = \sum_{k=1}^{m} \gamma_k^t P_k,$$

$$\gamma^t \geq 0,$$

$$1^T \gamma^t = 1,$$

where $\mu$ and $\delta$ are two small non-negative parameters. Since max $(0, \delta \delta |F_{i,*} - F_{j,*}|2)$ is a non-convex function with respect to F, the domain of $F_1, \ldots, F_m \in \{0,1\}^{n \times r}$ can be changed to $F'_1, \ldots, F'_m \in \{-1,1\}^{n \times r}$. Then the similarity between data point i and data point j can be encoded as $|F_{i,*} + F_{j,*}|_2^2$. This term is zero if $\forall k$, $F_{i,k}$ and $F_{j,k}$ have the same absolute value but opposite signs, thus encouraging different labels. For simplicity, $\mu$ and $\delta$ can be set to 0, so that the above optimization becomes:

$$\min_{\gamma^t \in R^m} \sum_{s_{ij} \in M} |F_{i,*} - F_{j,*}|_2^2 + \quad \text{(EQ 7)}$$

$$\sum_{s_{ij} \in C} |F_{i,*} + F_{j,*}|_2^2 + \lambda |\gamma^t - \gamma^{t-1}|_2^2$$

$$\text{s.t. } F = \sum_{k=1}^{m} \gamma_k^t P_k,$$

$$\gamma^t \geq 0,$$

$$1^T \gamma^t = 1.$$

Encoding F by $\gamma$ creates $$\min_{\gamma^t \in R^m} f(\gamma^t) = \sum_{s_{ij} \in M} \left\| \sum_{k=1}^{m} \gamma_k^t (P_{k'}(i,:) - P_{k'}(j,:)) \right\|_2^2 + \quad \text{(EQ 8)}$$

$$\sum_{s_{ij} \in C} \left\| \sum_{k=1}^{m} \gamma_k^t (P_k'(i,:) + P_k'(j,:)) \right\|_2^2 + \lambda |\gamma^t - \gamma^{t-1}|_2^2$$

$$\text{s.t. } \gamma^t \geq 0,$$

$$1^T \gamma^t = 1,$$

where the notation $P'_k(i,:)$ represents the i-th row of the matrix $P'_k$. The optimization problem (EQ 8) can be efficiently solved by gradient descend method. Specifically, the $\gamma^t$ is updated by $$\gamma^t = P_\Delta(\gamma^{t-1} - \eta \nabla f(\gamma^{t-1})),$$

where $\eta$ is a step size and $P_\Delta: R^m \to R^m$ is a projection operator defined as $$[P_\Delta(\gamma)]_i = \max(0, \gamma_i) / \sum_{i=1}^{m} \max(0, \gamma_i)$$

Let $U^{(ij)}$ be an m x r matrix, where the k-th row of $U^{(ij)}$ is $P'_k(i,:) - P'_k(j,:)$. Likewise, let $V^{(ij)}$ be an m x r matrix, where the k-th row of $V^{(ij)}$ is equal to $P'_k(i,:) + P'_k(j,:)$. Then, $\nabla f(\gamma)$ can easily be computed as $$\nabla f(\gamma^{t-1}) = 2\left( \sum_{s_{ij} \in M} \gamma^{t-1} U^{(ij)} U^{(ij)T} + \sum_{s_{ij} \in C} \gamma^{t-1} V^{(ij)} V^{(ij)T} + \gamma^{t-1} - \gamma^{t-2} \right)$$

Then $\gamma^t$ is given by $$\gamma^t = P_\Delta \left\{ \gamma^{t-1} \left[ I_m - 2\eta \left( \sum_{s_{ij} \in M} U^{(ij)} U^{(ij)T} + \sum_{s_{ij} \in C} V^{(ij)} V^{(ij)T} \right) \right] - 2\eta(\gamma^{t-1} - \gamma^{t-2}) \right\}, \quad (EQ\ 9)$$

where $I_m$ is the m x m identity matrix. Note that $U^{(ij)}U^{(ij)T}$ and $V^{(ij)}V^{(ij)T}$ can be computed for each pair (i,j) stored in a server. Accordingly, using EQ 9, $\gamma^t$ can be efficiently updated based on $\gamma^{t-1}$ and new pairwise constraints $\Omega_t$.

Despite the efficiency of updating $\gamma$, the space complexity of storing all the matrices $U^{(ij)}U^{(ij)T}$ and $V^{(ij)}V^{(ij)T}$ is $O(n^2m^2)$ which is expensive when the number of objects n is large.

Note that the k-th row of the matrix $U^{(ij)}$ either contains all 0 entries, indicating that the extreme point partition $P'_k$ put object i and object j in the same cluster, or contains one 2, one -1, and 0 for all the remaining entries, indicating that the extreme point partition $P'_k$ put object i and object j in different clusters. Thus the diagonal elements of the matrix $U^{(ij)}U^{(ij)T}$ are either 0 or a positive value (for example, the diagonal equals a positive value of 8). Thus, $$I_m - 2\eta \sum_{s_{ij} \in M} U^{(ij)} U^{(ij)T}$$

basically means that less weights should be assigned to the extreme point partitions which mistakenly assign the object i and the object j in different clusters while they have a must-link connection. Likewise, $$I_m - 2\eta \sum_{s_{ij} \in M} U^{(ij)} U^{(ij)T}$$

essentially means that less weights should be assigned to the extreme point partitions which mistakenly assign the object i and object j in the same cluster while they have a cannot-link constraint. After applying projection step $P_\Delta$ the extreme point partitions which are consistent with the new pairwise constraints are assigned with larger weights, while the extreme point partitions which are not consistent with the new pairwise constraints are assigned with smaller weights. This leads to a relaxed updating procedure $$\gamma^t = P_\Delta \left\{ (1 - 2\eta)\gamma^{t-1} + 2\eta\gamma^{t-2} - \eta\gamma^{t-1} \sum_{s_{ij} \in \Omega} A^{(i,j)} \right\} \quad (EQ\ 10)$$

where $A^{(ij)}$ is a m×m diagonal matrix defined as $$A^{(ij)} = \begin{bmatrix} g(P'_1(i,:), P'_1(j,:), s_{ij}) & \cdots & 0 \\ \vdots & \ddots & \vdots \\ 0 & \cdots & g(P'_m(i,:), P'_m(j,:), s_{ij}) \end{bmatrix} \quad (EQ\ 11)$$

Here g(a, b, s) is an indicator function whose inputs are two vectors a and b as well as a pairwise constraint s. It is defined as follows:

g(a,b,s)={0 if a=B when s∈M, or if a≠b when s∈C, 1 otherwise}

The updating procedure (EQ 10) is a relaxation of the procedure (EQ 9) and, in one embodiment, applies a greedy search method. It can be shown that the value of objective function (EQ 8) decreases using the updating procedure (EQ 10). Since the objective function (EQ 8) is lower bounded by 0, it is directly followed by the convergence of the proposed optimization problem.

After obtaining the updated simplex $\gamma_t$, a labeling matrix P can be computed by convex combination of the extreme points with weights $\gamma_t$ $$P = \gamma_1^t P_1 + \gamma_2^t P_2 + \ldots + \gamma_m^t P_m$$

Figure 2:
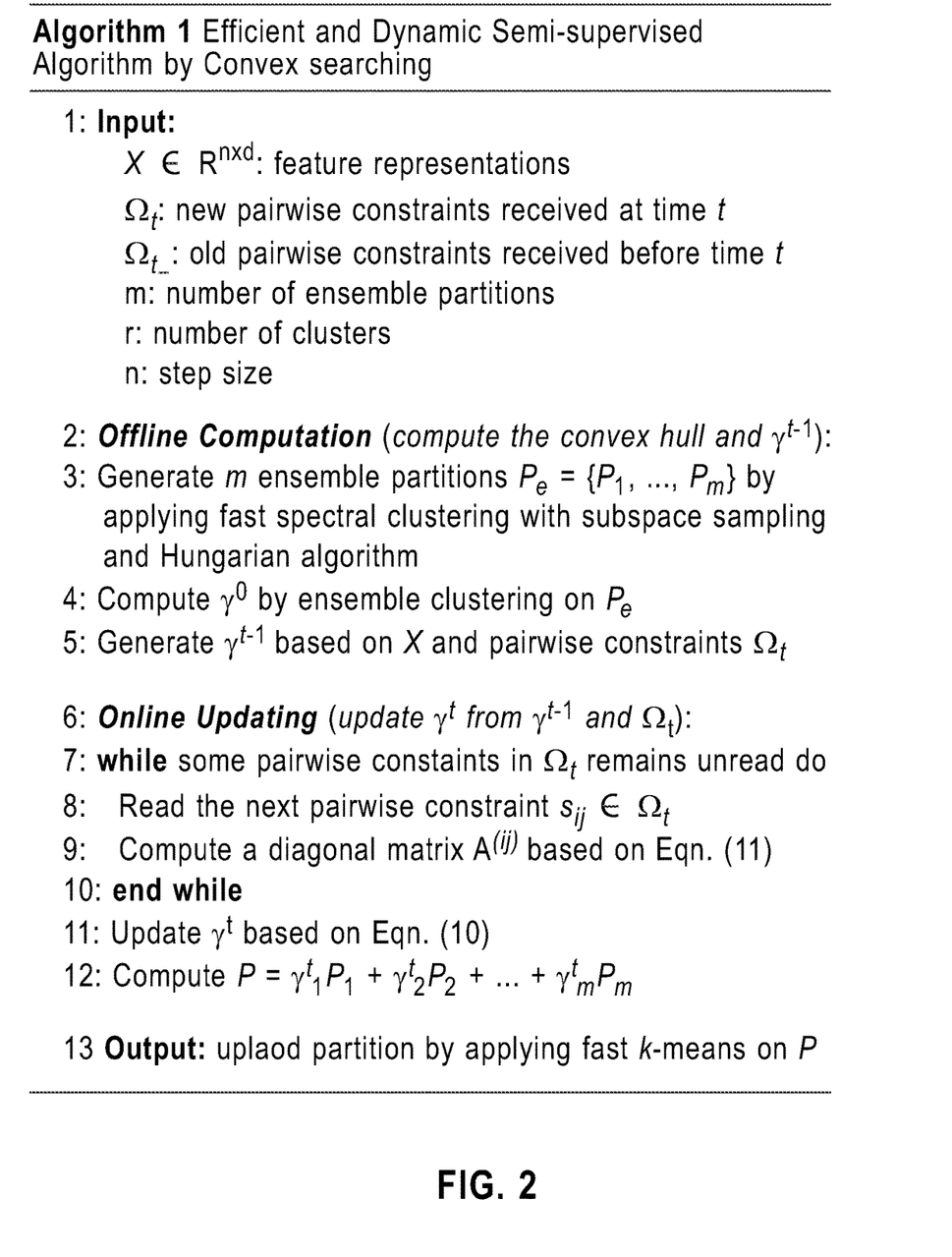
FIG. 2 shows an exemplary algorithm in one embodiment of the present invention.

Then the final partition can be obtained by running fast k-means algorithm over P. The time complexity to update the simplex vector $\gamma_t$ from $\gamma_{t-1}$ is only $O(m^2)$, which is a constant time irrelevant to the data size. By running k-means on an n x r matrix P, the time complexity is O(mr). Since both m and r are much smaller than n, the total time complexity is O(n), which cannot be further improved since all the n data points need to be assigned to one cluster. FIG. 2 shows an exemplary algorithm.

As shown in FIG. 2, in one embodiment, the input can be feature representations, new pairwise constraints received at time t, old pairwise constraints received before time t, number of clusters and set size. Initially, in line 2, offline computation is performed in which the convex hull is computed. Next, in line 3, m ensemble partitions are generated by applying fast spectral clustering with subspace sampling and/or Hungarian algorithm. In line 4, a simplex vector γ0 is computed by ensemble clustering on the ensemble partitions. In line 5, a simplex vector $\gamma^{t-1}$ is computed based on the feature representations and pairwise constraints. In line 6, online updating of simplex vector $\gamma^t$ from simplex vector $\gamma^{t-1}$ and the new pairwise constraints commences. This updating, as shown in lines 7-10, is performed while some pairwise constraints remain unread, and the update comprises, at line 8, reading the next pairwise constraint and, at line 9, computing a diagonal matrix based on a predetermined equation, such as (EQ 11) described herein. When no more pairwise constraints remain unread, in line 11, simplex vector $\gamma^t$ is updated based on another predetermined equation, such as (EQ 10) described herein. In line 12, a new partition P is computed from the input feature representations and the computed simplex vectors. In line 13, the updated partition is output by applying fast k-means on the partition.

Extensive empirical evaluations of the inventive dynamic semi-supervised clustering algorithm, Constrained Clustering by Convex Searching ("CCCS"), are presented.

The following six public benchmark databases are used in the exemplary empirical evaluations.

USPS is a widely used handwritten digit database from J. J. Hull, "A database for handwritten text recognition research", containing 9,298 handwritten images. Each image is a 256 dimensional vector that belongs to one of ten classes.

RCV1 is a subset of text documents from the RCV1 corpus, created by David D. Lewis, et al., "A new benchmark collection for text categorization research". It contains 193,844 documents that belongs to one of 103 classes.

20 Newsgroups database contains 18,774 documents that belong to twenty (20) news categories.

BlogCatalog is a social network dataset that was crawled on an internet website known as BlogCatalog created by the inventors. When removing the users in multiple groups, 19,664 users who belong to one of 60 different groups remain.

TDT2 dataset contains 9,394 documents belonging to one of 30 classes.

MNIST is also a well-known handwritten digits database. It contains a total of 70,000 handwritten digits.

The statistics of these datasets are summarized in Table I.

TABLE I

| Name | # Instances | # Features | # Clusters |
|---|---|---|---|
| USPS | 9,298 | 256 | 10 |
| RCV1 | 193,844 | 47,236 | 103 |
| 20 Newsgroups | 18,774 | 61,188 | 20 |
| TDT2 | 9,394 | 36,771 | 30 |
| BlogCatalog | 19,664 | 5,413 | 60 |
| MNIST | 70,000 | 784 | 10 |

Evaluation and parameter settings for these experiments can be as follows. Normalized mutual information ("NMI") is used to measure the coherence between the inferred data partitions and the ground truth categorization. Given the ground truth partition $D=\{D_1, D_2, \ldots, D_r\}$ and the partition $D'=\{D'_1, D'_2, \ldots, D'_r\}$ generated by clustering algorithm, the normalized mutual information is computed as $$NMI(D, D') = \frac{2MI(D, D')}{H(D) + H(D')},$$

where $MI(X, Y)$ represents the mutual information between the random variables X and Y, and $H(X)$ represents the Shannon entropy of random variable X. The higher the NMI value ($0 \le NMI \le 1$), the better the clustering performance.

To generate ensemble partitions $P_1, P_2, \ldots, P_m$, initially, d' out of d features are randomly sampled to compute m different similarity matrices. Two criteria are used in determining the values for d'. First, d' should be small enough to make the ensemble partitions diverse. Second, d' should be reasonably large to get good enough ensemble partitions since the quality of the starting point $\gamma^0$ is highly depend on the quality of the ensemble partitions. In one embodiment, d' may be set as d'=d/10. Further, in one embodiment, the step size $\eta$ in (EQ 10) may be set to 0.02.

Figure 3A:
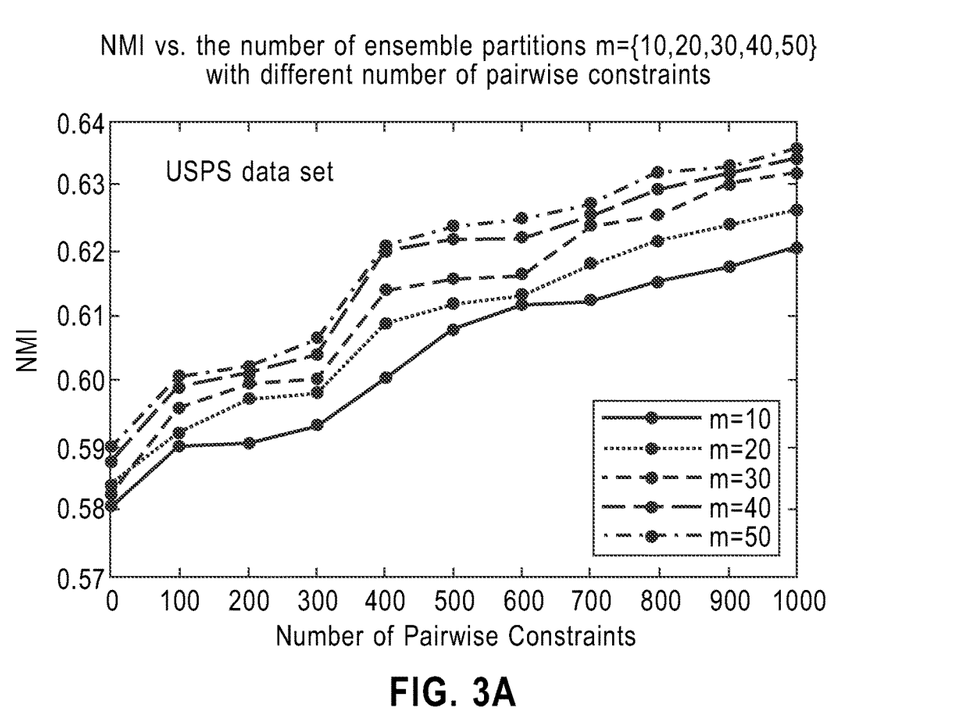
FIGS. 3A and 3B illustrate NMI vs. number of ensemble partitions with different pairwise constraints.
Figure 3B:
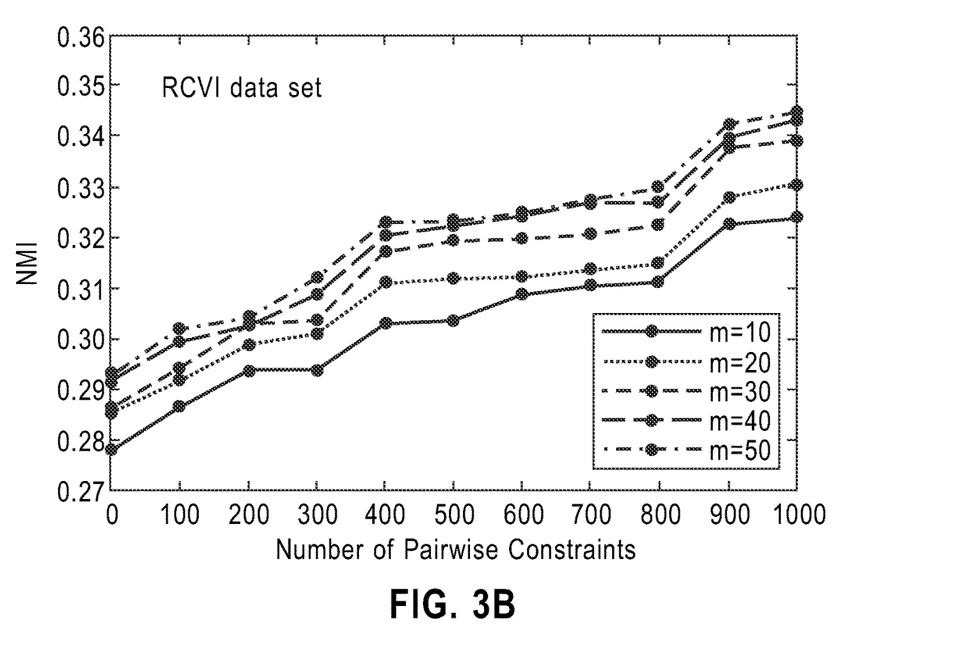
Figure 4A:
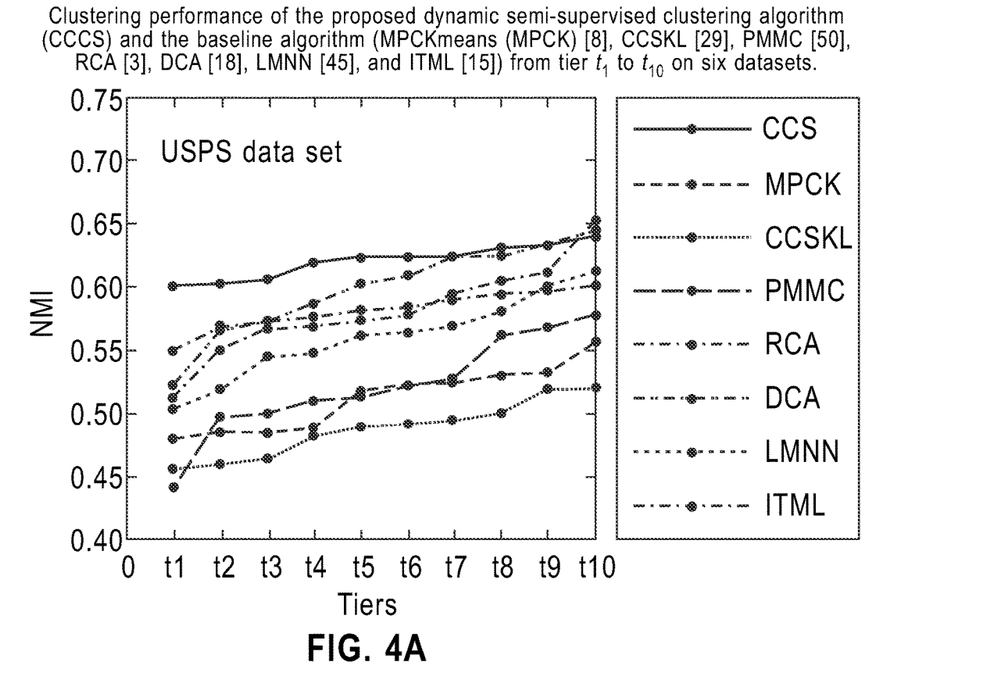
FIGS. 4A-4F illustrate clustering performances averaged over a plurality of trials.
Figure 4B:
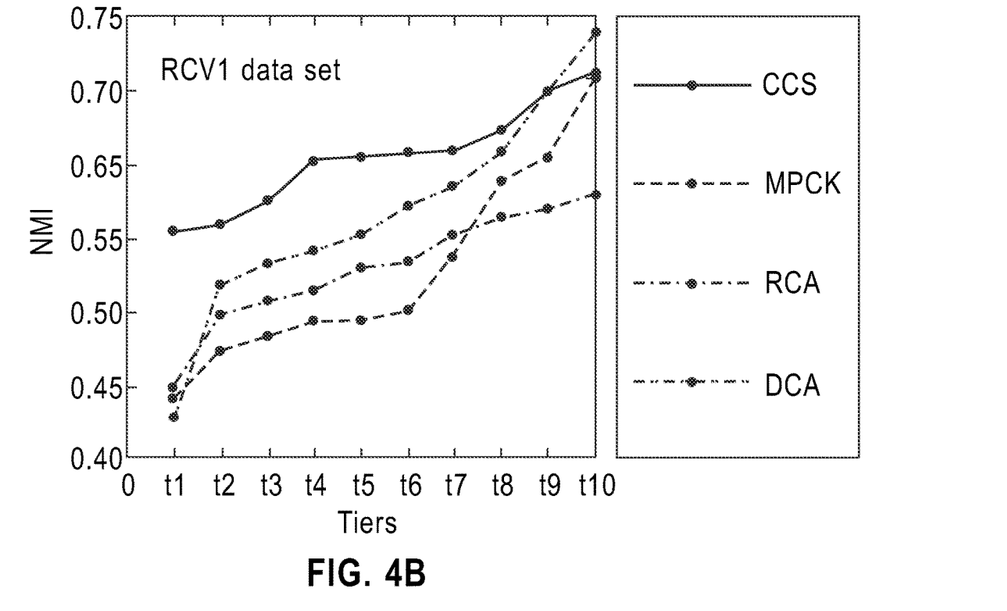
Figure 4C:
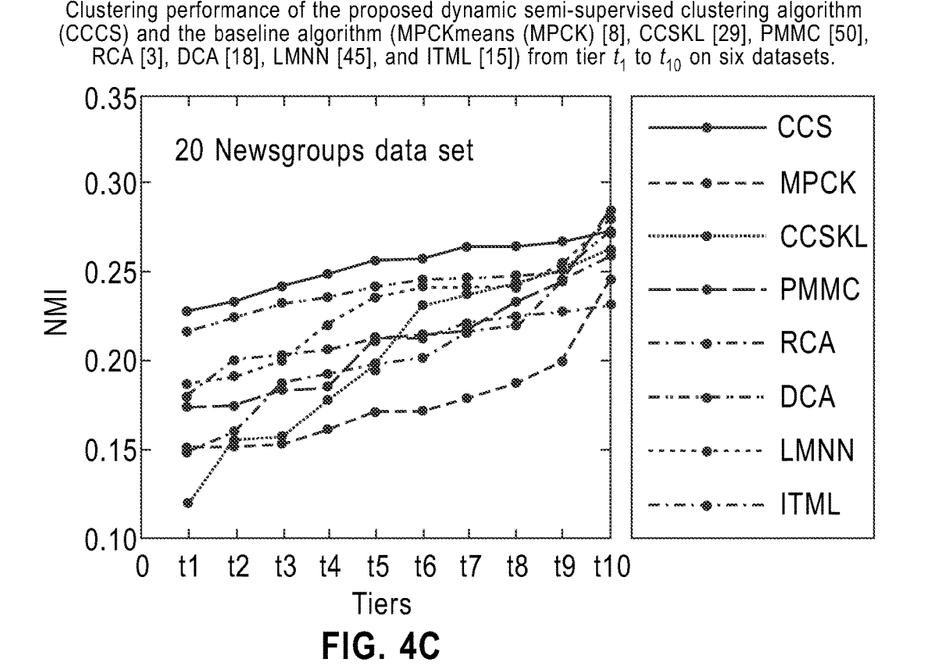
Figure 4D:
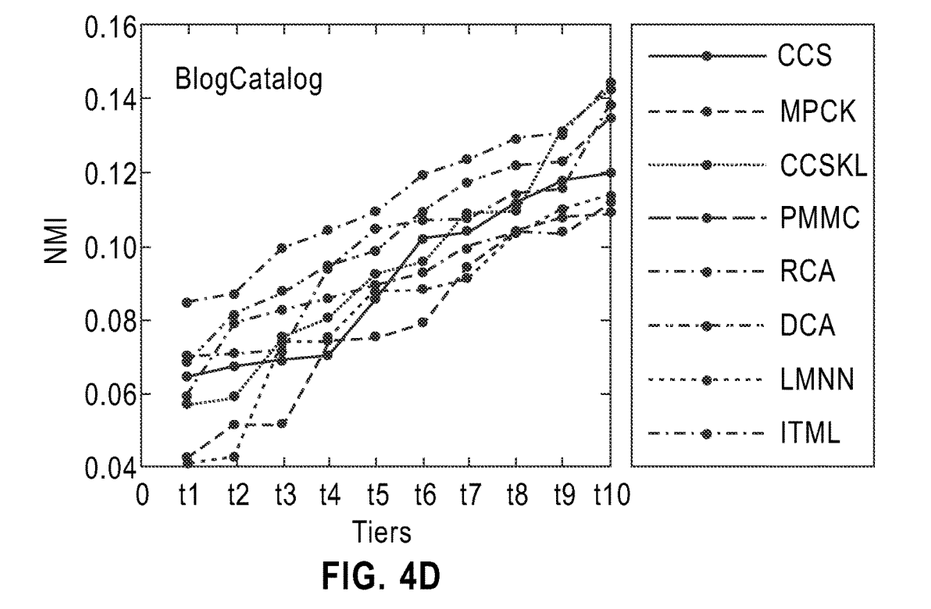
Figure 4E:
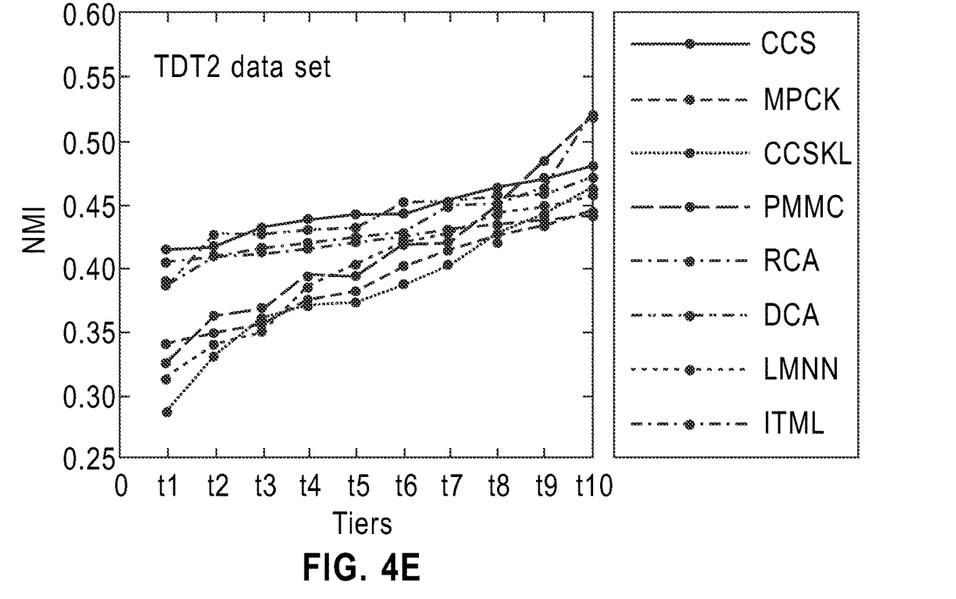
Figure 4F:
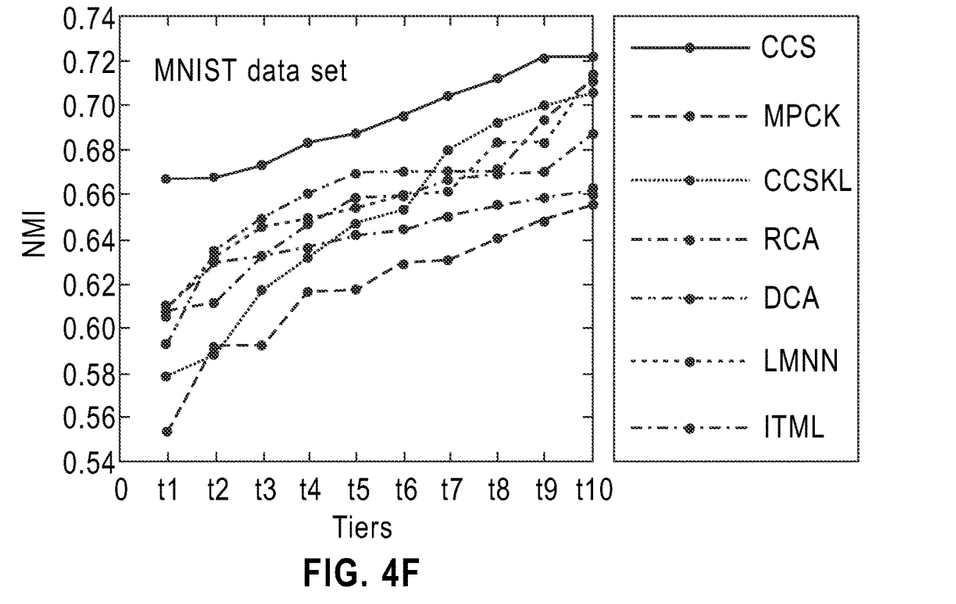

Next, how the number of ensemble partitions m influences the clustering performance is analyzed. Initially, two benchmark datasets, USPS and RCV1, are used to analyze how the performance is influenced by different number of ensemble partitions m. These two datasets are chosen since they are the smallest and the largest datasets, e.g., testbeds, in the experiment. Also, this allows an analysis of whether the selection of m is influenced by the data size n. To this end, for both of the two datasets, begin with the unsupervised data partition $\gamma^0$ generated from m={10, 20, 30, 40, 50} different ensemble partitions. Then add 100 randomly sampled pairwise constraints in each tier or iteration, e.g., one round of computation, and execute the proposed semi-supervised clustering algorithm to update the partition. This step is repeated ten (10) times, until the total number of pairwise constraints achieves 1,000. FIGS. 3A and 3B provide two examples of how the performance of the proposed dynamic semi-supervised clustering algorithm is changed with different m and different number of pairwise constraints. FIG. 3A shows pairwise constraints using the USPS data set and FIG. 3B shows pairwise constraints using the RCV1 data set.

Initially, observe that the clustering performance keeps increasing as more and more pairwise constraints have been provided. Moreover, the clustering performance was improved when m increases. The performance gain may be due to the fact that a larger m indicates a larger searching space and also a larger overlap between the convex hull $\Delta'$ and the convex constraint set $\Delta$ in accordance with (EQ 3). Also, a large number of ensemble partitions usually provide more diverse clustering results, leading to a better opportunity to find some data partitions that are consistent with most of the pairwise constraints. Furthermore, the performance of the proposed semi-supervised clustering algorithm gradually stabilizes as m increases to 50. This is also consistent with the initial assumption, since when the number of ensemble partitions are already large enough, adding more partitions cannot provide more information since it is most likely that the new partitions are almost the same as some existing partitions. This provides guidance to appropriately choose m: on one hand, m should be reasonably large to provide a diverse and large enough convex searching space $\Delta'$, while on the other hand, m should be relatively small to reduce the computational cost to update the partitions. In one experimental embodiment, m=50.

Comparison with other baseline algorithms can be performed to examine the effectiveness and efficiency of the inventive semi-supervised clustering algorithm. In one aspect, the inventive CCCS can be compared to the following seven state-of-the-art algorithms for semi-supervised clustering, including three constrained clustering algorithms and four distance metric learning algorithms. The three constrained clustering algorithms are (a) MPCK-means, the metric pairwise constrained k-means algorithm, (b) CCSKL, constrained clustering by spectral kernel learning, and (c) PMMC, pairwise constrained maximum margin clustering. The four state-of-the-art distance metric learning algorithms are (d) RCA, the relevant component analysis, (e) DCA, the discriminative component analysis, (f) LMNN, the large margin nearest neighbor classifier, and (g) ITML, the information theoretic metric learning algorithm. The code for the baseline algorithms was provided by their respective authors. For a fair comparison, all the parameters used in the baseline algorithms were their suggested values (if applicable).

In one set of experiments, start with 100 randomly generated pairwise constraints, denoted as tier $t_1$. Then in each tier, another set of 100 randomly sampled pairwise constraints are generated and all the semi-supervised clustering algorithms are called to update the data partition given the newly generated pairwise constraints. Specifically, the baseline semi-supervised clustering algorithms are re-executed by combining the new pairwise constraints with the old ones. These steps are repeated from tier $t_1$ to tier $t_{10}$, leading to a total of 1,000 randomly sampled pairwise constraints. In one aspect, all the experiments are performed on a PC with Intel Xeon 2:40 GHz processor and 64:0 GB of main memory. Each experiment is repeated five times, and the clustering performance averaged over the five trials is shown in FIGS. 4A-4F.

First observe that, compared to all the baseline algorithms, the inventive dynamic semi-supervised clustering algorithm CCCS yields the best performance for most of the datasets (USPS, RCV1, 20 Newsgroups, BlogCatalog and MNIST). Especially when given a small number of the pairwise constraints, CCCS outperforms the compared methods with significant performance gain. This is because by generating a convex hull from a set of ensemble partitions, the possible searching space is dramatically reduced so that all of the inner points in that convex hull can correspond to reasonably good data partitions. Also, by computing the starting point $\gamma^0$ based on the idea of ensemble clustering, it is not surprising that $\gamma^0$ should already be close to the optimal solution. Thus a simple locally-focused search is good enough to recover the optimal partition.

In addition to superior performance, the inventive CCCS algorithm is also extremely efficient, requiring much less running time compared to all the baseline algorithms. FIG. 5 is a table that summarizes the average running time to update the partitions of the CCCS algorithm as well as all the baseline algorithms in each tier, reporting the running time of the three largest datasets, i.e., MNIST, 20 Newsgroups, and RCV1. The results in the table in FIG. 5 show that the CCCS algorithm updates the partition in a time that is significantly less than all the baseline algorithms. Specifically, the results show that even for a dataset with about 200,000 data points, it takes less than 30 seconds for CCCS to update the partitioning.

Figure 6:
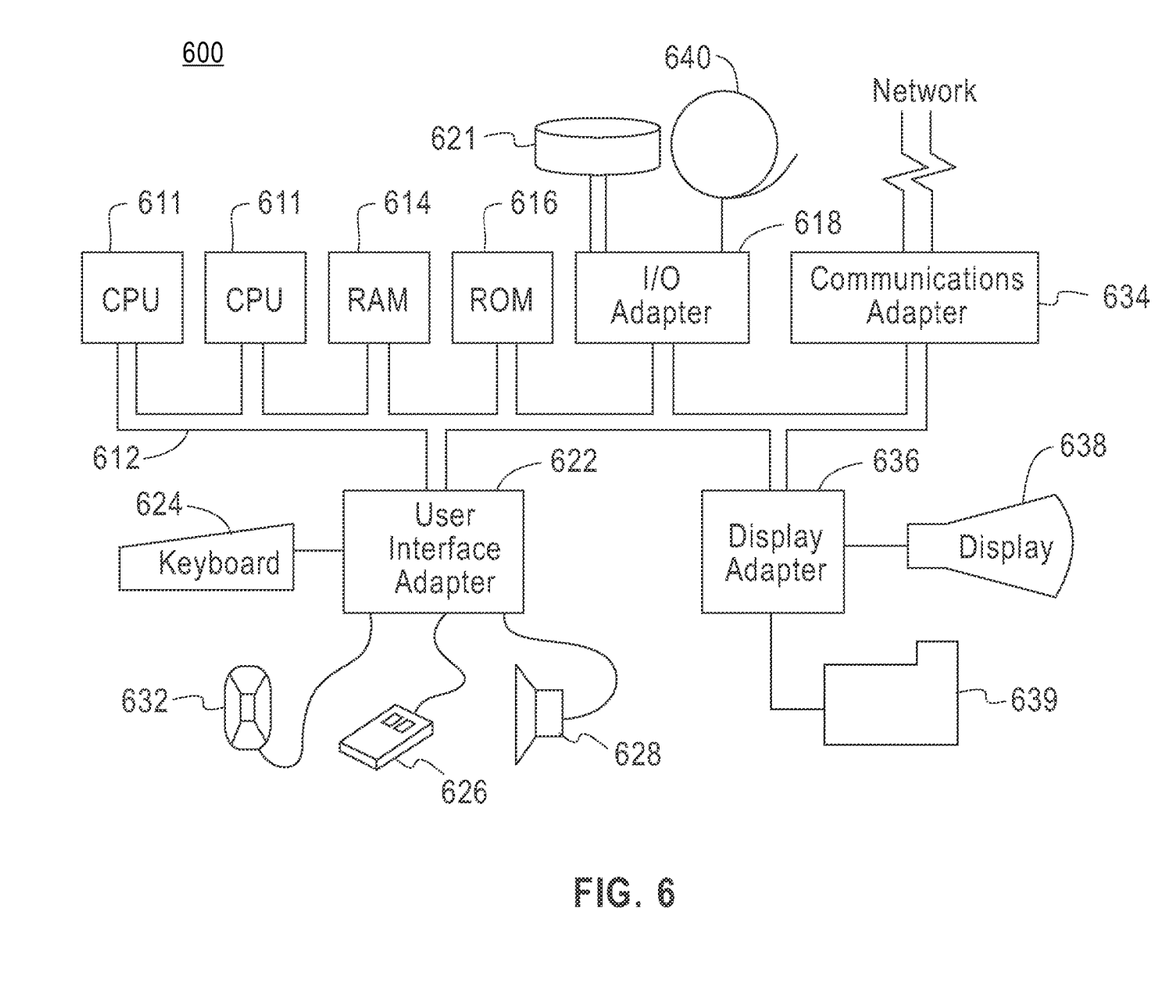
FIG. 6 illustrates exemplary computing systems that can run the method of the present invention in one embodiment.

FIG. 6 illustrates an exemplary hardware configuration of a computing or mobile device computing system infrastructure 600 in which the present methods can be executed, in one embodiment. In one aspect, computing system 600 is programmed to run one or more applications, and is programmed to perform the method processing steps of FIG. 1. The hardware configuration preferably has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, disk drive device 632, and/or other user interface device to the bus 612), a communication adapter 634 for connecting the system 600 to a data processing network, the Internet, an Intranet, a local area network (LAN), etc., and a display adapter 636 for connecting the bus 612 to a display device 638 and/or printer 639 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A computer-implemented method for dynamic, semi-supervised clustering, comprising:
   receiving data attributes;
   generating a set of ensemble partitions using the data attributes;
   forming a convex hull using the set of ensemble partitions;
   generating a simplex vector by performing ensemble clustering on the convex hull, the simplex vector being a vector whose elements are non-negative and the summation of all of the elements equals one;
   receiving one or more pairwise constraints;
   deriving an optimal simplex vector using the simplex vector and the one or more pairwise constraints;
   computing a current optimal clustering result using the optimal simplex vector; and
   outputting the current optimal clustering result,
   wherein a hardware processor device is configured to perform said attribute receiving, generating partitions, forming the convex hull, generating the simplex vector, dynamic link receiving, deriving, computing and outputting.

2. The method according to claim 1, further comprising repeating said receiving links, deriving an optimal simplex vector, and computing a current best clustering result when additional one or more pairwise constraints are received.

3. The method according to claim 1, wherein the attributes are received from one of: handwritten images as vectors, and a profile obtained from a social networking platform.

4. The method according to claim 1, wherein the ensemble partitions are generated using a fast spectral clustering with subspace sampling.

5. The method according to claim 1, wherein the ensemble partitions are further refined using the fast spectral clustering with a Hungarian algorithm.

6. The method according to claim 1, wherein the one or more pairwise constraints comprise one or more must-link links and one or more cannot-link links.

7. A system for dynamic, semi-supervised clustering, comprising:
   a memory device;
   a display device; and
   a hardware processor coupled to the memory device, the processor configured to:
   receive data attributes;
   generate a set of ensemble partitions using the data attributes;
   form a convex hull using the set of ensemble partitions;
   generate a simplex vector by performing ensemble clustering on the convex hull, the simplex vector being a vector whose elements are non-negative and the summation of all of the elements equals one;
   receive one or more pairwise constraints;
   derive an optimal simplex vector using the simplex vector and the one or more pairwise constraints;
   compute a current optimal clustering result using the optimal simplex vector; and
   output the current optimal clustering result to the display device.

8. The system according to claim 7, further comprising repeating receiving links, deriving an optimal simplex vector, and computing a current best clustering result when additional one or more pairwise constraints are received.

9. The system according to claim 7, wherein the attributes are received from one of: handwritten images as vectors, and a profile obtained from a social networking platform.

10. The system according to claim 7, wherein the ensemble partitions are generated using a fast spectral clustering with subspace sampling.

11. The system according to claim 10, wherein the ensemble partitions are further refined using the fast spectral clustering with a Hungarian algorithm.

12. The system according to claim 7, wherein the one or more pairwise constraints comprise one or more must-link links and one or more cannot-link links.

13. A computer program product for using a multiuser system, the computer program product comprising a non-transitory storage medium readable by a processing circuit and storing instructions run by the processing circuit for performing method steps for dynamic, semi-supervised clustering, comprises:
  receiving data attributes;
  generating a set of ensemble partitions using the data attributes;
  forming a convex hull using the set of ensemble partitions;
  generating a simplex vector by performing ensemble clustering on the convex hull, the simplex vector being a vector whose elements are non-negative and the summation of all of the elements equals one;
  receiving one or more pairwise constraints;
  deriving an optimal simplex vector using the simplex vector and the one or more pairwise constraints;
  computing a current optimal clustering result using the optimal simplex vector; and
  outputting the current optimal clustering result.

14. The computer program product according to claim 13, further comprising receiving links, deriving an optimal simplex vector, and computing a current best clustering result when additional one or more pairwise constraints are received.

15. The computer program product according to claim 13, wherein the attributes are received from one of: handwritten images as vectors, and a profile obtained from a social networking platform.

16. The computer program product according to claim 13, wherein the ensemble partitions are generated using a fast spectral clustering with subspace sampling.

17. The computer program product according to claim 16, wherein the ensemble partitions are further refined using the fast spectral clustering with a Hungarian algorithm.

18. The computer program product according to claim 13, wherein the one or more pairwise constraints comprise one or more must-link links and one or more cannot-link links.

* * * * *